CHUTE SANITIZER AND FIRE EXTINGUISHER

Original Filed April 22, 1971 3 Sheets-Sheet 1

CHUTE SANITIZER AND FIRE EXTINGUISHER

Original Filed April 22, 1971 3 Sheets-Sheet 2

CHUTE SANITIZER AND FIRE EXTINGUISHER

Original Filed April 22, 1971 3 Sheets-Sheet 3

United States Patent

Re. 28,397

Reissued Apr. 22, 1975

28,397

CHUTE SANITIZER AND FIRE EXTINGUISHER

John A. Boyd, 3314 Holloman Road,
Falls Church, Va. 22042

Original No. 3,690,560, dated Sept. 12, 1972, Ser. No. 136,381, Apr. 22, 1971. Application for reissue Mar. 6, 1974, Ser. No. 448,691

Int. Cl. B05b *9/00*

U.S. Cl. 239—195 9 Claims

Matter enclosed in heavy brackets [ ] appears in the original patent but forms no part of this reissue specification; matter printed in italics indicates the additions made by reissue.

ABSTRACT OF THE DISCLOSURE

An apparatus is disclosed for sanitizing as well as extinguishing fires in a rubbish chute. Both the sanitizer and fire extinguisher portions of the apparatus are vertically movable within an existing rubbish chute. For sanitizing purposes, the apparatus has a plurality of spray nozzles which are directed at the vertical walls within the rubbish chute. By moving sanitizing apparatus vertically through the rubbish chute, the interior walls can be sprayed with a sanitizing chemical. The fire extinguisher, being also vertically movable through the rubbish chute, can be positioned at a point above and close to a fire and, thus quickly extinguish any fires which might occur within the rubbish chute.

This invention relates to modifications to existing rubbish chutes within typical multi-story housing and commercial buildings in urban areas and more particularly it relates to an apparatus for both sanitizing and fire extinguishing within existing rubbish chutes.

In many urban areas, it has been customary to provide high density housing which has often taken the form of multi-story dwellings. In addition, urban business establishments are often housed within multi-story buildings. A common problem associated with multi-story business and dwelling structures has been the disposal of wastes. The disposal of such wastes has been facilitated by providing rubbish chutes within the multi-story structures. Such rubbish chutes typically have an opening on each floor so that the occupants of these floors can deposit their wastes in the vertical rubbish chute. The wastes deposited therein fall through the chute to a collection area which is usually located in the basement of the building.

In many of the rubbish chute installations, the collection area was often an incinerator in which a fire was periodically lighted by the building maintenance staff. The fire could consume the wastes which collected at the bottom of the rubbish chute and the heated gases would escape vertically through the rubbish chute, itself, the heat serving to sanitize the inner walls of the rubbish chute.

In recent years, both the public and the government have become increasingly concerned about the incineration of wastes. Such incineration is a substantial contributor to air pollution, a problem to which the public and the government is actively seeking a solution. The solution which has been most common in the past and is likely to be continued is that of passing ordinances or laws to prohibit the incineration of waste, unless the incinerator facilities can meet certain rigid air pollution standards.

In order to meet the current air pollution standards, an existing incinerator in a multi-story building would normally require substantial modification. Such modification, in most instances, would be extremely costly to the owner of the building and, thus, would be unlikely to be made if a less expensive alternative were available.

One obvious solution to the air pollution problem resulting from the incineration of wastes is to stop using the rubbish chute and to cease burning within the associated incinerator. This solution is not ideal because tenants living in upper stories of the structure would have no easy method of disposing of wastes without carrying them down many flights of stairs.

A second approach would be to continue using the rubbish chute but to cease the incineration of the wastes. This alternative does solve the waste disposal problem for the tenants of the building but it leaves behind a sanitation problem coupled with the problem of accidental fires within the rubbish chute itself. Since the incineration of wastes was the only solution to sanitizing the rubbish chute, continued use of the chute without incineration will cause the walls of the chute to become contaminated by the continued contact of the waste against the walls of the chute. In addition, the collection of waste materials in the basement is always subject to accidental ignition which would give rise to the undesired pollution of the air as well as objection of the owner of the building to punishment for violation of air pollution ordinances or statutes.

Because of the health and accidental fire problems associated with the use of an existing rubbish chute within a multi-story structure, it is a primary object of this invention to provide an apparatus for solving the health and accidental fire problem associated with the continued use of an existing rubbish chute without incineration.

Another object of this invention is to provide an apparatus for chemically sanitizing existing rubbish chutes to eliminate any health hazards caused by the use of a rubbish chute without incineration.

Another object of this invention is to provide an apparatus for use within an existing rubbish chute for quickly extinguishing any accidental fires which might occur within the chute.

Another object of this invention is to provide a combined sanitizing and fire extinguishing unit which is movable as a unit through the rubbish chute.

Another object of this invention is to modify an existing rubbish chute for use without incineration, the modifications being relatively inexpensive although effective in meeting health standards as well as preventing accidental fires within the chute.

Further objects, advantages and salient features of the present invention will become apparent from the following detailed description, which, considered in conjunction with the annexed drawings, discloses preferred embodiments of the invention.

In order to accomplish the foregoing objects, the present invention is characterized by a sanitizer and fire extinguisher unit which are combined into a single housing. This housing is vertically movable in an already existing rubbish chute. The sanitizer is operative to spray sanitizing chemicals along the vertical walls of the rubbish chute. The sanitizing operation would be performed periodically by the building maintenance personnel. The fire extinguisher function can be either automatic or manual upon the detection of a fire in the rubbish chute and will cause either a chemical fire extinguisher or a water supply to spray the rubbish chute with materials for extinguishing any fire which might occur within the chute.

Referring to the drawings, which form a part of this original disclosure:

Figure 1:
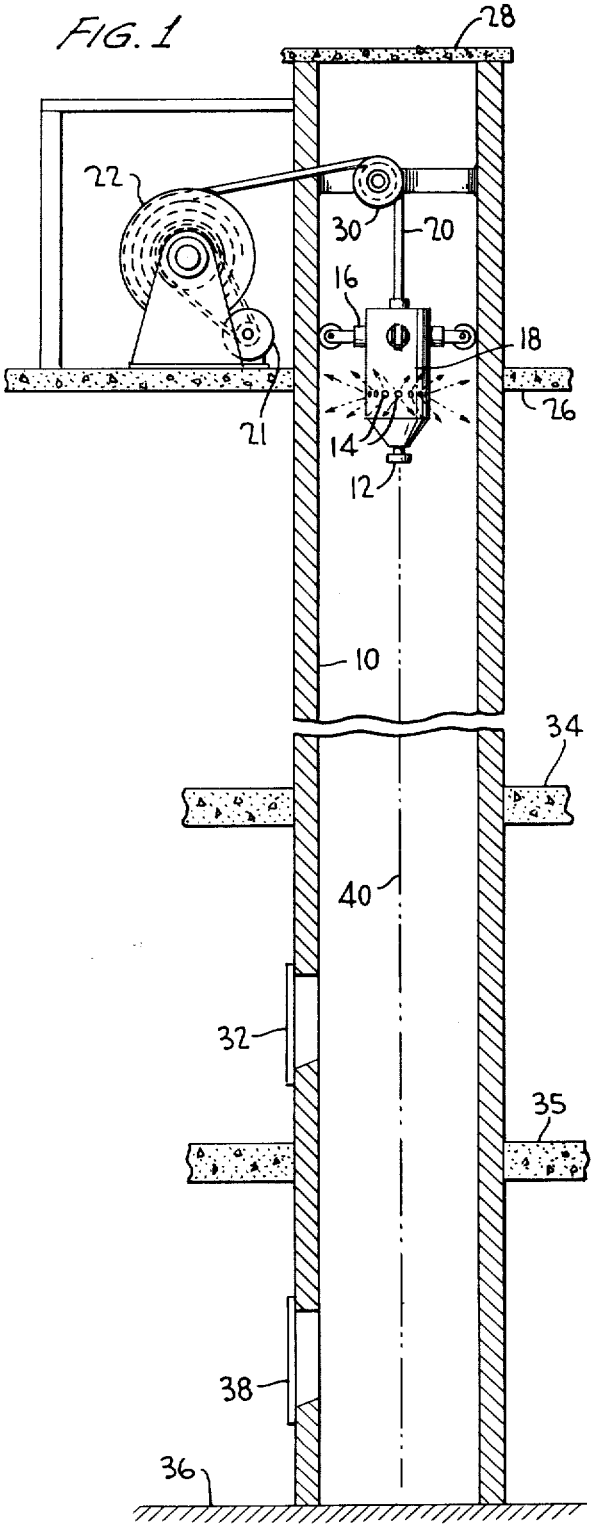
FIG. 1 is a longitudinal sectional view of a rubbish chute with the apparatus of the present invention positioned therein.

Referring now to FIG. 1, the present invention is shown in combination with an already existing rubbish chute in a multi-story building. The rubbish chute 40 has chute walls 10 which extend from the basement 36 of the building vertically through the roof 26 to a chute cover 28. The first floor 35 and the second floor 34 of the structure are shown with the chute walls 10 passing therethrough. In addition, a hopper door 32 is provided for persons living on the first floor so that rubbish can be placed within chute 40. The rubbish will collect on the basement floor 36 and can be removed by opening service door 38.

Inside of rubbish chute 40, the sanitizing and fire extinguishing unit 18 is suspended by flexible water hose 20. The sanitizer and fire extinguisher unit 18 has a plurality of spacer arms 16 mounted thereon. These spacer arms are optional and are required only in installations where the sanitizer and fire extinguisher unit 18 is difficult to maintain in a position which is somewhat central to the rubbish chute. The water hose 20 is supported by pulley 30. The water hose passes around pulley 30 and is wrapped onto reel 22. Motor 24 is capable of driving reel 22 in clockwise or counterclockwise directions as viewed in FIG. 1 and is connected to reel 22 by a pulley and belt arrangement or by an appropriate set of gears. Since motor 24 is reversible, the sanitizer and fire extinguisher unit 18 can be raised or lowered within rubbish chute 40.

The flexible hose 20 is shown connected to the sanitizer in fire extinguisher unit 18. Fluids passing through a flexible hose will pass through the sanitizer and fire extinguisher unit 18 and out nozzles 14. The fluids being sprayed from nozzle 14 are sprayed in a direction and with a sufficient force that the rubbish chute walls 10 will be coated by the liquid materials being sprayed. By lowering and raising the sanitizer and fire extinguisher unit 18, all the vertical portions of wall 10 of rubbish chute 40 can be coated with a fluid containing a chemical sanitizer, the sanitizer being added to the fluids passing through water hose 20 by the sanitizer and fire extinguisher unit 18.

In conditions where fire is detected in rubbish chute 20, the fluids passing through flexible hose 20 would exit from the sanitizer and fire extinguisher unit 18 by a sprinkler head 12. Sprinkler head 12 would act to evenly distribute the fluids passing through flexible hose 20 into the vertical portion of the rubbish chute 40. This even distribution of fluids, which usually would be water, will act to extinguish any fire within the chute walls 10.

Figure 2:
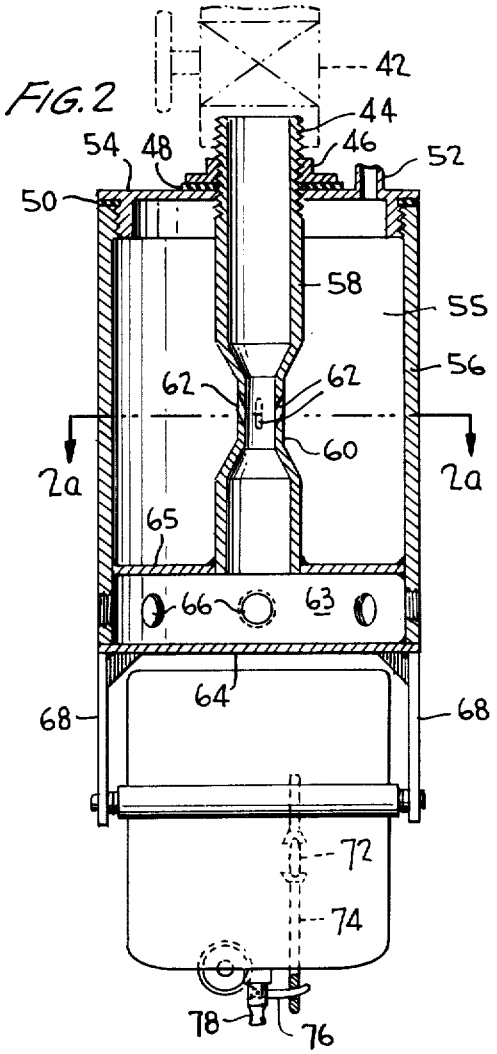
FIG. 2 is a longitudinal sectional view of one embodiment of the present invention.

Referring now to FIG. 2, a more detailed drawing of the sanitizer and fire extinguisher of FIG. 1 is shown. The flexible hose will connect to valve 42 which controls the flow of fluid, normally water, into the sanitizer and fire extinguisher apparatus. Valve 42 is connected to the sanitizer-extinguisher by threaded connection 44. Sealing nut 46 and gasket 48 make a waterproof seal for the water connection.

Screw top 54 and gasket 50 are inserted into the top portions of the wall 56 of the sanitizer-extinguisher unit. Screw top 54 is also equipped with a fill and vent 52 which allow fluids to be poured into internal chamber 55 when the vent 52 is removed. When the vent 52 is in position, as the fluid level in chamber 55 decreases, air passes through vent 52 permitting the contents of the chamber 55 to remain under approximately the same pressure at all times.

When valve 42 is opened, fluids will pass through valve 42 and into water pipe 58 which has a venturi section 60. After passing through the venturi section 60, the fluid will pass into spray chamber 63 formed between a bottom wall 64 and an intermediate wall 65. The water will then pass out through spray nozzles 66 spaced circumferentially about the side wall 56 in the region of the spray chamber 63. The spray nozzles permit the fluid from the spray chamber 63 to exit and to impinge upon the walls of the rubbish chute 40 in which the sanitizer-extinguisher is suspended.

From the bottom wall 64, rigid brackets 68 are provided to support a commercially available fire extinguisher 70. The fire extinguisher 70 is supported in such a way that the nozzle 78 thereof is always positioned along a vertical line and capable of spraying the contents of the fire extinguisher upon any fire located below nozzle 78. The fire extinguisher apparatus is equipped with a fusible link 72 and a release arm 74. Release arm 74 is directly connected to spring loaded control lever 76. Without any restraining pressure upon level 76, a valve connected to lever 76 will be opened automatically. When fusible link 72 is intact and release arm 74 is attached as shown in FIG. 2, spring loaded arm 76 is in a closed position which prevents any fluids from escaping from fire extinguisher 70. Fusible line 72, however, is made out of a material which is temperature sensitive and which will melt if the intensity of heat becomes strong enough. The melting of fusible link 72 by the presence of heat will cause spring loaded arm 76 to rotate a valve within extinguisher 70 and cause the contents therein to pass through nozzle 78 and be directed downwardly upon any fire below.

Figure 2A:
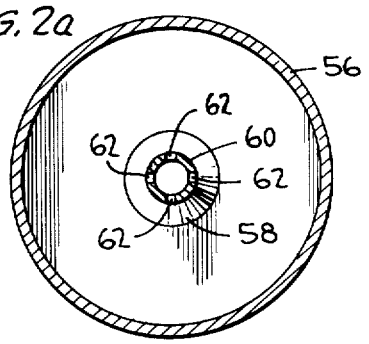
FIG. 2a is a transverse sectional view taken along line 2a—2a of FIG. 2.

When the sanitizer-extinguisher is operating in a sanitizing mode, the fluid flowing in the venturi section 60 will be at reduced pressure, and, consequently, any fluid in chamber 55, which is at a somewhat higher pressure, will flow through suction opening 62 in the venturi to mix with the fluid passing through venturi section 60. FIG. 2a shows the concentric relationship between the suction nozzle 62, venturi section 60 and the pipe walls 58. In addition the outside wall 56 of the sanitizer-extinguisher is shown to further emphasize the relative sizes of the elements of FIG. 2a.

Figure 3:
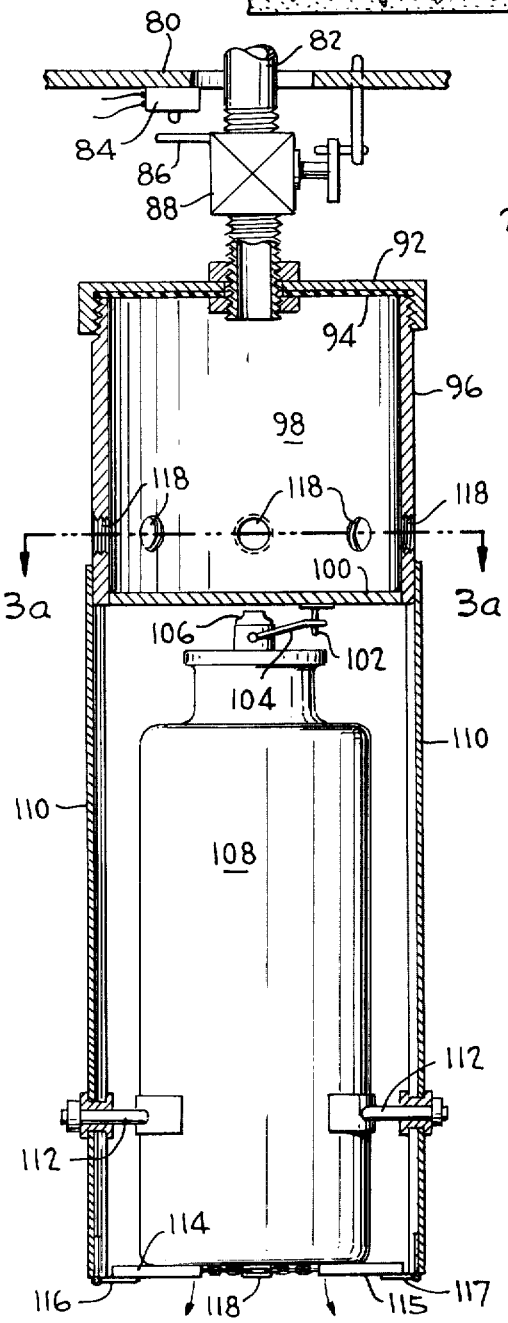
FIG. 3 is a longitudinal sectional view of another embodiment of the present invention.
Figure 3A:
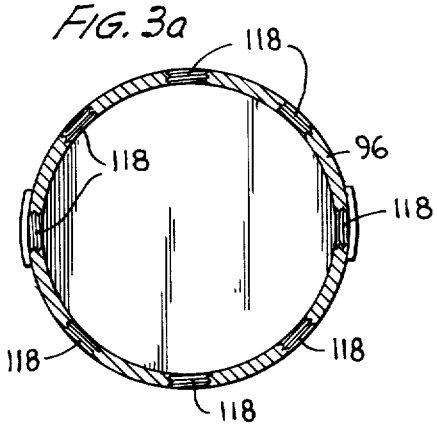
FIG. 3a is a transverse sectional view taken along line 3a—3a of FIG. 3.

Recognizing that the section of the apparatus shown in FIG. 2 which is devoted to the mixing of sanitizing chemicals which are contained in chamber 55 with the fluid passing through venturi section 60 does not have to be physically located on the movable portions of the sanitizer-extinguisher, FIG. 3 shows an alternate embodiment of the sanitizer-extinguisher of FIG. 2. A stationary frame 80 is placed within the rubbish chute and a hose 82 passes therethrough and ultimately connect to a hose reel (as shown in FIG. 1).

In FIG. 3, the hose 82 connects directly to valve 88 which, when opened will allow fluids to pass through the valve into spray chamber 98. Shut-off means 90 is provided to prevent flow of fluids through valve 88 whenever shut-off means 90 is in close proximity to the stationary frame 80. When the sanitizer-extinguisher of FIG. 3 is lowered away from stationary frame 80, valve 88 opens and fluids pass therethrough into spray chamber 98 and out through spray nozzles 118.

The sanitizer-extinguisher has a spray chamber 98 which is surrounded by walls 96 and cover 92. A gasket 94 is provided to seal the cover 92 and walls 96 in order to force fluids passing through spray chamber 98 out through spray nozzles 118.

Located physically below the spray chamber is a fire extinguisher 108 supported by brackets 110 and connected swivel arms 112. Fire extinguisher 108 is maintained in the position shown by arms 114 which are attached to the bracket 110 via hinges 116. A fusible link 118 is shown between arms 114 and 115 and maintains these arms in the position shown in FIG. 3 until such time as fusible link 118 has been melted, a condition which will occur when an intense heat is present in close proximity to fusible link 118.

When fusible link 118 is melted, arms 114 and 115 will rotate about hinges 116 and 117 respectively in the directions of the arrows. This condition will cause fire extinguisher 108 to rotate about swivel arms 112 so that nozzle 106 will be facing downwardly. When the extinguisher 108 rotates about swivel arms 112, valve trip means 104 contacts rigid member 102 which is attached to the spray chamber base 100. When trip means 104 contacts rigid member 102, the valve in extinguisher 108 is opened and fluids will begin to pass through nozzle 106. When nozzle 106 reaches a vertical position and facing downwardly, the fluids passing therethrough will fall directly upon any fire below.

Figure 5:
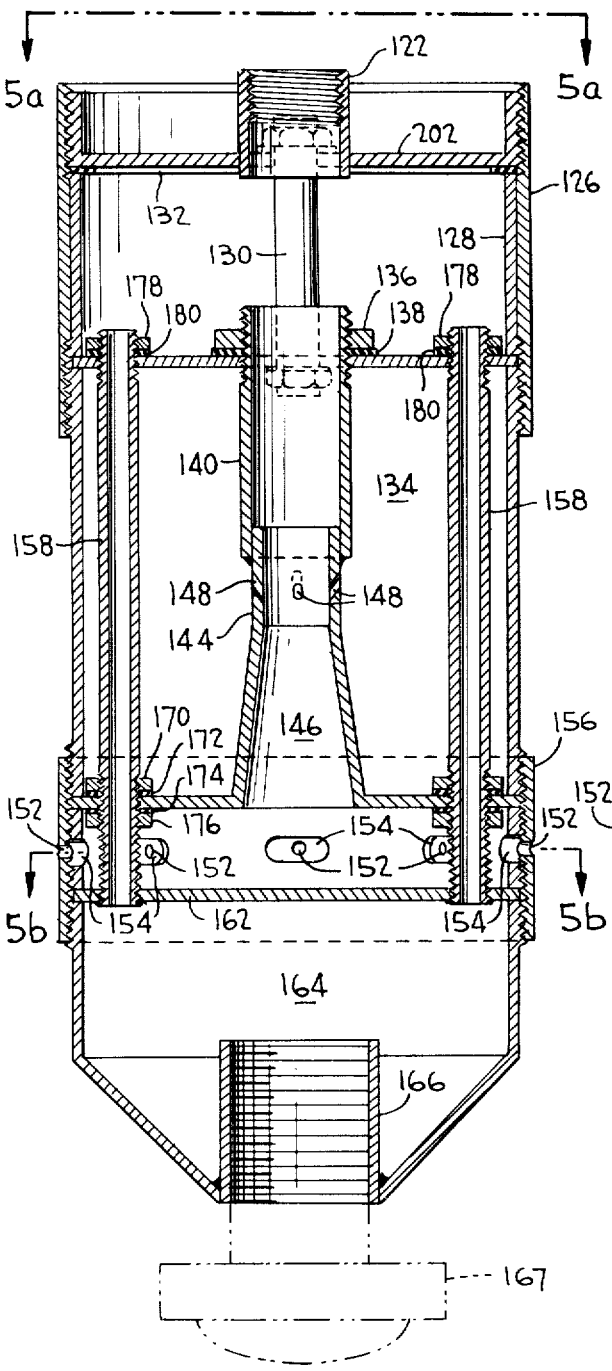
FIG. 5 is a longitudinal sectional view of another embodiment of the present invention.

Referring now to FIG. 5, a modified sanitizer-extinguisher is shown in which water from a connecting water pipe is allowed to either mix with sanitizing fluid or also act as the extinguishing fluid which would fall onto a fire below. The water hose is connected to water connector 122 which passes through cover 202. Water flowing through connector 122 would flood water chamber 124 which is bounded by cover 202 with its gasket 132 on the top and divider 200 on the bottom and spacer sleeve 128 inside of side portion 126. Divider 200 has water connector pipes 158 passing therethrough, each water connector pipe 158 being secured within water chamber 124 by nuts 178 and gaskets 180.

The sanitizing fluid chamber 134 is bounded on its top by divider 200, its bottom by floor 160 and its sides 206. The side portion 206 is threadably attached to water chamber side 126 and spray chamber 156. The sanitizing fluid chamber 134 has two filling pipes 130 which pass through water chamber cover 202 and divider 200 to permit fluids to be placed into sanitizing fluid chamber 134 as well as allow air to fill the void caused by any fluids being removed from this chamber.

Passing through the center of the sanitizing fluid chamber is a pipe section 140 which passes through divider 200 and is secured by nut 136 and gasket 138. Fluids can pass from water chamber 124 through pipe section 140 into venturi section 144 and on into mixing chamber 146.

As has been explained before, the passage of water through venturi section 144 will cause sanitizing fluid contained within sanitizing fluid chamber 134 to pass through venturi orifices 148 and mix with the fluid passing through venturi section 144 in mixing chamber 146. The fluids then pass into spray chamber 150 which is bounded by its top with sanitizing fluid chamber bottom 160 and spray chamber bottom 162. Nuts 170 and 176 in combination with gaskets 172 and 174 all respectively around water connector pipe 158 operate to secure the sanitizing fluid chamber floor 160 in the position as shown. The spray chamber has an outside wall 156 through which a plurality of spray orifices 152 pass therethrough. A spray chamber spacer 168 is also provided with a plurality of larger orifices 154, the larger orifices 154 being provided to more easily line up with the spray orifices 152 in the spray chamber wall 156. Any fluids passing through the mixing chamber 146 will ultimately pass through spray orifices 152 and will act to spray upon the vertical walls of the rubbish chute in which the sanitizer-extinguisher might be suspended.

As second water chamber 164 is also provided and water will fill chamber 164 because it is in communication with water chamber 124 via water connection pipes 158. The second water chamber is provided with a sprinkler connector 166 into which a typical sprinkler head might be screwed. Such a standard sprinkler head, indicated in phantom lines as 167, would be equipped with a temperature activation device which prevents water from flowing through a sprinkler valve until such time as an intense heat opens the valve. The water contained in second water chamber 164 would then flow through the sprinkler device and be sprayed upon any fire below. If a second temperature sensing device were also available to control the water flowing into water hose connector 122, the building water supply could also be directly connected via water chamber 164 to the sprinkler screwed into sprinkler head connector 166.

Figure 5A:
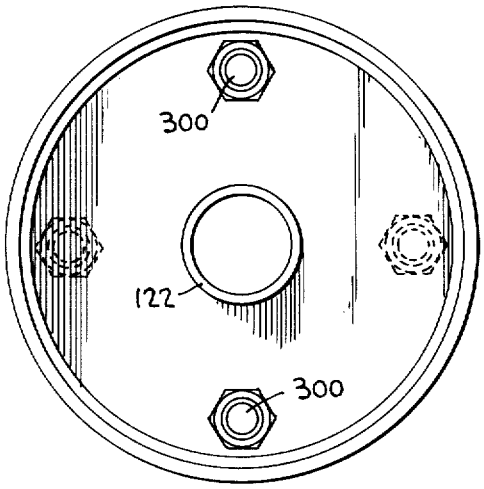
FIG. 5a is a top plan view thereof looking along the line 5a—5a of FIG. 5.

FIG. 5a shows a horizontal view taken along line 5a—5a of FIG. 5 which shows the top of the sanitizer-extinguisher unit. The hose connection 122 is shown in the center of the top. Openings 300 are the centers of pipes which extend from the top of the sanitizer-extinguisher through the liquid chamber 124 into the chemical chamber 134. These pipes are used to fill the chemical chamber as well as provide a vent.

Figure 5B:
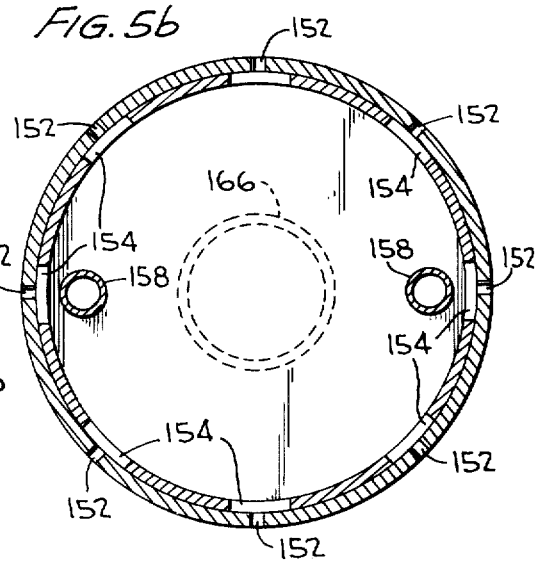
FIG. 5b is a transverse sectional view thereof taken along the line 5b—5b of FIG. 5.

FIG. 5b shows a horizontal sectional view taken along line 5b—5b of FIG. 5 and shows the spray chamber of the sanitizer-extinguisher. The sectional view shows the spray orifices 152 and the larger oblong orifices 154.

Figure 4:
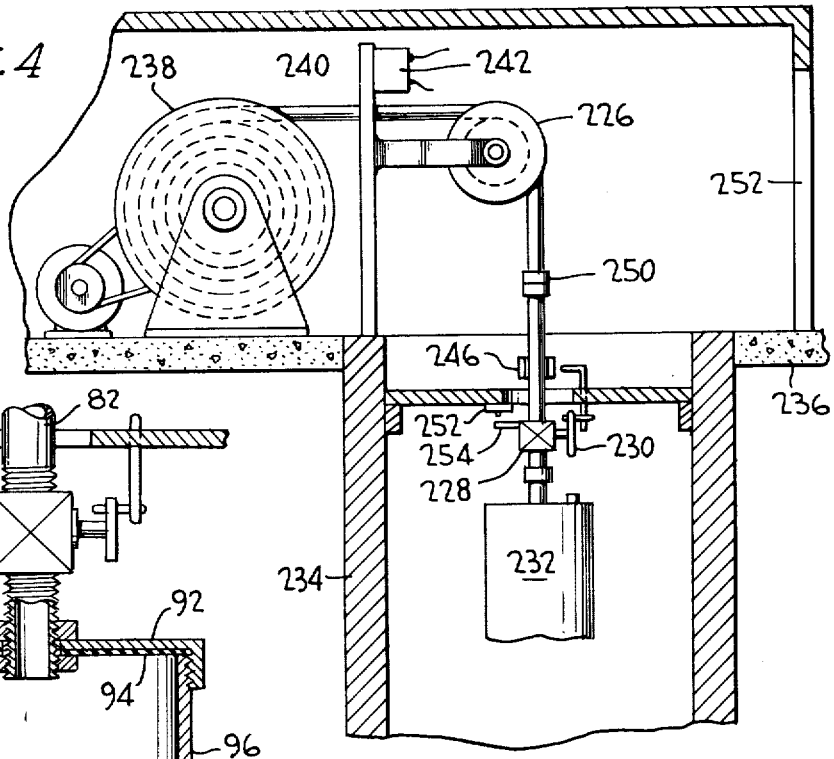
FIG. 4 is a fragmentary sectional view of the rubbish chute and the mechanism for raising and lowering the sanitizer-extinguisher apparatus.

Referring now to FIG. 4, one embodiment of the apparatus for raising and lowering the sanitizer-extinguisher unit within a rubbish chute is shown. Reel 238 is employed to coil the flexible hose 240 which is used to support the sanitizer-extinguisher unit. Reel 238 is connected to a pulley which has a drive belt wrapped therearound and which also passes around pulley 222, the latter pulley being driven by start-stop motor 220. By appropriate electrical controls, start-stop motor 220 can be made to rotate either in a clockwise or counterclockwise direction. As a consequence, the flexible pipe 240 can either be stored onto or removed from reel 238. Flexible hose 240 passes over pulley 226 and ultimately attaches to valve 228 from which the sanitizer-extinguisher 232 is suspended. The sanitizer-extinguisher unit 232 moves vertically between the walls 234 of the rubbish chute but never rises above the roof 236 of the structure. Generally, a closed housing 252 will be placed on the roof 236 over the mechanism shown in FIG. 4 to protect the mechanism from weather conditions as well as from any tampering by unathorized persons.

As the sanitizer-extinguisher unit 232 is lowered, a stop member 250 located along the hose will eventually come into contact with limit switch 246. This contact will cause start-stop motor 220 to reverse. Once the sanitizer-extinguisher unit has risen to the position shown in FIG. 4, water shut off means 230 will become activated to close valve 228 which prevents any further water from the flexible hose from entering the sanitizer-extinguisher unit.

The electrical controls for the start-stop motor 230 include a switch 242 which operates to set control relays in appropriate condition so that start-stop motor 230 will cause the sanitizer-extinguisher unit 232 to be lowered through the rubbish chute. When stop member 250 contacts limit 246, limit 246 activates control relays to reverse the direction of rotation of start-stop motor 230. When stop bar 254 comes into contact with limit switch 242, the control relays will be set in such a manner as to stop all rotation of start-stop motor 220 and place it into condition for manual starting by activating switch 242.

While the foregoing particular description has been made with reference to various embodiments of the invention as shown by the drawings, it will be recognized by those skilled in the art that there are numerous physical configurations which might be employed to accomplish the objectives of the present invention. Such modifications in form only will fall within the scope of the present invention.

What is claimed is:

1. Apparatus for fluid treatment of an elongated chute extending between the floors of a multi-story building, said apparatus comprising:

an elongated flexible fluid supply conduit adapted to be connected to a fluid source;

a housing connected to one end of said fluid supply conduit; and conduit control means disposed adjacent the upper end of said elongated chute for selectively lowering and raising said conduit, and the housing connected thereto, within said elongated chute;

said housing including a chamber which receives fluid from said supply conduit, a plurality of outlet openings communicating with said chamber to permit separate streams of fluid to exit therethrough and to impinge upon the walls of said elongated chute for fluid treatment thereof, a tubular flow duct disposed between said chamber and said fluid supply conduit to permit said fluid to be transmitted from said conduit to said chamber through said flow duct, a chemical storage chamber [surrounding] *communicating with* said flow duct, and means for [admitting] *transferring* chemical from said chemical storage chamber [into] *to* said flow duct.

2. Apparatus as defined in claim 1, wherein said means for admitting chemical from said chemical storage chamber into said flow duct includes a venturi section in said flow duct and aperture means within said flow duct at said venturi section to provide fluid communication between said chemical storage chamber and the interior of said flow duct.

3. Apparatus as defined in claim 2, wherein said conduit control means includes a reel upon which said conduit is at least partially coiled and reversible drive means for rotating said reel in one direction to uncoil said conduit from said reel and hence to lower said conduit and said housing within said chute, and for rotating said reel in the opposite direction to coil said conduit upon said reel to raise said conduit and housing within said chute.

4. Apparatus as defined in claim 2, wherein said housing further includes supplemental chamber means for receiving fluid from said conduit and heat activated sprinkler means connected with said supplemental chamber means to permit the fluid to discharge through said sprinkler means in the event that the heat within said chute reaches a predetermined level.

5. Apparatus as defined in claim 4, wherein said supplemental chamber means includes a first supplemental chamber above said chemical storage chamber for receiving fluid from said conduit, said flow duct being connected to said first supplemental chamber to receive fluid therefrom, a second supplemental chamber, and at least one flow pipe extending between said first and second supplemental chambers.

6. Apparatus as defined in claim 1, further including fire extinguisher means having a fire extinguishing substance therein, said fire extinguisher means being connected to said housing at the end opposite to that which connects to said conduit, said fire extinguisher means thus being movable within said elongated chute, and heat sensing means to activate said fire extinguisher means when the heat intensity indicates the presence of a fire within said chute.

7. Apparatus as defined in claim 6, wherein said heat sensing means includes a fusible link which melts at a predetermined heat intensity.

8. Apparatus as defined in claim 7, wherein said fire extinguisher means is of the type which is activated by inversion and wherein mounting means for said fire extinguisher means normally maintain said extinguisher means in an upright position, said heat sensing means cooperating with said mounting means to cause said extinguisher means to be inverted at said predetermined heat intensity.

9. Apparatus as defined in claim 8, wherein said mounting means includes depending bracket means on said housing, swivel connection means pivotally mounting said fire extiguisher means to said bracket means, and holder bar means normally contacting against said fire extinguisher means to maintain said extinguisher means upright and to prevent the same from pivoting about said swivel connection means, said fusible link being connected to said holder bar whereby melting of the link will release said holder bar and will permit said extinguisher means to pivot about said swivel arm means and invert, thus discharging the fire extinguishing substance into said chute.

References Cited

The following references, cited by the Examiner, are of record in the patented file of this patent or the original patent.

UNITED STATES PATENTS

| | | | |
|---|---|---|---|
| 3,635,230 | 1/1972 | Kirschke | 134—168 C |
| 3,606,862 | 9/1971 | Huff et al. | 118—306 |
| 1,719,371 | 7/1929 | Holt et al. | 169—2 R |
| 2,461,517 | 2/1949 | Carnevale | 118—Dig. 10 |
| 2,735,794 | 2/1956 | Pletcher | 239—Dig. 13 |
| 3,326,288 | 6/1967 | Pittman | 118—306 X |
| 3,457,895 | 7/1969 | Mukai | 118—306 X |

LLOYD L. KING, Primary Examiner

J. J. LOVE, Assistant Examiner

U.S. Cl. X.R.

118—306; 169—70